US010823948B2

(12) United States Patent
Gögler

(10) Patent No.: US 10,823,948 B2
(45) Date of Patent: Nov. 3, 2020

(54) MICROSCOPE FOR IMAGING AN OBJECT

(71) Applicant: Carl Zeiss Microscopy GmbH, Jena (DE)

(72) Inventor: Michael Gögler, Wolfratshausen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 16/463,154

(22) PCT Filed: Nov. 22, 2017

(86) PCT No.: PCT/EP2017/080131
§ 371 (c)(1),
(2) Date: May 22, 2019

(87) PCT Pub. No.: WO2018/096003
PCT Pub. Date: May 31, 2018

(65) Prior Publication Data
US 2019/0278074 A1 Sep. 12, 2019

(30) Foreign Application Priority Data
Nov. 22, 2016 (DE) .................. 10 2016 122 529

(51) Int. Cl.
*G02B 21/24* (2006.01)
*G02B 21/00* (2006.01)
*G02B 21/08* (2006.01)

(52) U.S. Cl.
CPC ....... *G02B 21/245* (2013.01); *G02B 21/0096* (2013.01); *G02B 21/086* (2013.01); *G02B 21/241* (2013.01)

(58) Field of Classification Search
None
See application file for complete search history.

(56) References Cited

U.S. PATENT DOCUMENTS 4,595,829 A 6/1986 Neümann et al.
7,199,360 B1 4/2007 Montagu
(Continued)

FOREIGN PATENT DOCUMENTS

DE 3219503 A1 12/1983
DE 10157613 A1 10/2002
(Continued)

OTHER PUBLICATIONS

PCT International Preliminary Report on Patentability for International Application No. PCT/EP2017/080131, dated Jun. 6, 2019, 7 pages.
(Continued)

*Primary Examiner* — William B Perkey
(74) *Attorney, Agent, or Firm* — Patterson Thuente Pedersen, P.A.

(57) ABSTRACT

A microscope for imaging an object, comprising a lens for imaging the object through an imaging beam path, a light source for generating illumination radiation, at least one optical element for coupling the illumination radiation into the imaging beam path such that a common beam path is formed between the optical element and the lens, wherein the imaging radiation path runs through the common beam path, and the illumination radiation is guided through the common beam path. The microscope also comprises a monitoring device for measuring an energy parameter of the illumination radiation, said monitoring device determining an energy parameter of radiation which is incident on the monitoring device, and a beam splitter device which is arranged in the common beam path upstream of the lens in the illuminating direction and couples measurement radiation out of the illumination radiation onto the monitoring device.

14 Claims, 3 Drawing Sheets

(56) References Cited

U.S. PATENT DOCUMENTS

| | | | |
|---|---|---|---|
| 7,289,265 B2 | 10/2007 | Koyama | |
| 7,907,271 B2 | 3/2011 | Christiansen et al. | |
| 8,027,030 B2 | 9/2011 | Christiansen et al. | |
| 8,120,768 B2 | 2/2012 | Christiansen et al. | |
| 8,314,931 B2 | 11/2012 | Christiansen et al. | |
| 8,427,635 B2 | 4/2013 | Christiansen et al. | |
| 8,619,252 B2 | 12/2013 | Nakasho | |
| 2002/0191177 A1 | 12/2002 | Ulrich et al. | |
| 2003/0184857 A1 | 10/2003 | Hay | |
| 2005/0035281 A1 | 2/2005 | Mehner et al. | |
| 2005/0275938 A1 | 12/2005 | Koyama | |
| 2007/0002437 A1 | 1/2007 | Spink et al. | |
| 2007/0081233 A1* | 4/2007 | Hattori | G02B 21/16 359/385 |
| 2009/0059215 A1 | 3/2009 | Mehanian et al. | |
| 2010/0033811 A1 | 2/2010 | Westphal et al. | |
| 2010/0208339 A1 | 8/2010 | Kleppe et al. | |
| 2011/0051232 A1 | 3/2011 | Steinborn | |
| 2011/0309231 A1 | 12/2011 | Cooper et al. | |
| 2012/0075456 A1 | 3/2012 | Seitz | |
| 2012/0133925 A1 | 5/2012 | Nakasho | |
| 2012/0314206 A1 | 12/2012 | Spizig et al. | |
| 2014/0047895 A1 | 2/2014 | Shih | |
| 2014/0295535 A1 | 10/2014 | Kitahara et al. | |
| 2014/0374575 A1 | 12/2014 | Takesue et al. | |
| 2016/0216504 A1 | 7/2016 | Hing et al. | |

FOREIGN PATENT DOCUMENTS

| | | |
|---|---|---|
| DE | 10142945 A1 | 4/2003 |
| DE | 102004046375 A1 | 4/2006 |
| DE | 102007047187 A1 | 4/2009 |
| DE | 102008034137 A1 | 4/2009 |
| DE | 102008018864 A1 | 10/2009 |
| DE | 102008018952 A1 | 10/2009 |
| DE | 202010010932 U1 | 10/2011 |
| EP | 1260848 B1 | 11/2002 |
| EP | 1353210 B1 | 10/2003 |
| EP | 1496384 A2 | 1/2005 |
| EP | 1605292 A1 | 12/2005 |
| EP | 2458420 B1 | 5/2012 |
| EP | 2784565 A1 | 10/2014 |
| EP | 2818905 A2 | 12/2014 |
| JP | H11-174332 A | 7/1999 |
| JP | 2004-177733 A | 6/2004 |
| JP | 2005-091701 A1 | 4/2005 |
| JP | 2013-174848 A | 9/2013 |
| JP | 2015-041007 A | 3/2015 |
| WO | WO 2007/144197 A1 | 12/2007 |

OTHER PUBLICATIONS

English translation of PCT International Preliminary Report on Patentability for International Application No. PCT/EP2017/080131, dated Jun. 6, 2019, 7 pages.

International Search Report for International Application No. PCT/EP2017/080131, dated Mar. 16, 2018; 4 pages.

English translation of International Search Report for International Application No. PCT/EP2017/080131, dated Mar. 16, 2018; 3 pages.

Grünwald et al.: "Calibrating excitation light fluxes for quantitative light microscopy in cell biology", Nat Protoc. 2008, 3 (11).

Olympus: Research Inverted Microscope—IX3 Series, Mar. 2014.

Thorlabs: Microscope Slide Silicon Power Head—S170C, Jul. 23, 2013.

Young et al.: "Photonic Calibration for Fluorescence Microscopy", SPIE, vol. 6859, 685915 (2008).

* cited by examiner

MICROSCOPE FOR IMAGING AN OBJECT

RELATED APPLICATIONS

This application is a National Phase entry of PCT Application No. PCT/EP2017/080131 filed Nov. 22, 2017, which application claims the benefit of priority to German Application No. 10 2016 122 529.0, filed Nov. 22, 2016, the entire disclosures of which are incorporated herein by reference.

FIELD OF THE INVENTION

The invention relates to a microscope for imaging an object, comprising an objective for imaging the object by way of an imaging beam path, a light source for producing illumination radiation, and a monitoring device for monitoring an energy parameter of the illumination radiation, wherein the monitoring device determines an energy parameter of radiation that is incident thereon.

BACKGROUND

In microscopes, laser-based methods such as laser scanning microscopy, and optical manipulation techniques, for example optical tweezers, it is frequently desirable to monitor the intensity of the illumination radiation. This supports the reproducibility of measurements. It is known to determine the intensity of the light source by way of arranging a radiation detector instead of the sample, whereby the intensity of the illumination radiation that is incident in the object can be determined. Such methods are known for example from EP 2458420 B1 or U.S. Pat. No. 8,619,252 B2. Since the measurement of the intensity can be performed only before or after the measurement in the sample, EP 1260848 B1 or EP 1353210 B1 proposes the provision of an intensity detector in the illumination beam path near the light source. In this way, the intensity of the illumination radiation emitted by the light source can also be determined during the measurement of the sample.

SUMMARY OF THE INVENTION

It is an object of the invention to provide a microscope which provides improved monitoring of the energy parameter of the illumination radiation.

The invention is defined in claim 1. Preferred embodiments are the subject matter of the dependent claims.

The invention creates a reflected light microscope for imaging an object, comprising an objective for imaging an object by way of an imaging beam path, a light source for producing illumination radiation, a monitoring device for monitoring an energy parameter of the illumination radiation, and a beam splitter device. The monitoring device determines an energy parameter of radiation that is incident thereon. The beam splitter device is arranged, in the illumination direction, upstream of the objective and couples out measurement radiation from the illumination radiation to the monitoring device. The microscope preferably furthermore comprises at least one optical element for coupling the illumination radiation into the imaging beam path. The imaging beam path is free from optical imaging elements between the beam splitting device, which couples out the measurement radiation, and the object.

Since the microscope is a reflected light microscope, the illumination radiation is coupled into the imaging beam path in the opposite direction of the imaging radiation and is then guided via the objective into the object (typically a sample). Between this input coupling site and the object, the imaging beam path consequently contains the illumination beam path. Here, the illumination radiation travels toward the object, and the imaging radiation travels away from the object. This section is typically also referred to as the common beam path. This terminology will also be used in the following description.

The beam splitter device for coupling out the measurement radiation to the monitoring device is arranged in the common beam path near the objective, such that the measurement radiation, which has been coupled out by the beam splitter device, is very exactly proportional to the energy parameter of the illumination radiation which is focused by the objective onto the object. In particular, all those changes in the energy parameter of the illumination radiation that are caused by previously traversed filters, optical elements or other effects are consequently captured by the monitoring device by way of the monitoring device. In this way, the monitoring device captures a signal owing to the beam splitter device at the objective, which signal corresponds particularly precisely to the energy parameter of the illumination radiation in the object itself. In particular, it is not necessary to take into account, by way of calculations or other considerations, the effects of inserted filters, lenses, or beam splitters because the measurement radiation is only coupled out from the illumination radiation when the illumination radiation has passed through these elements etc. At the same time, it is possible to determine the energy parameter of the illumination radiation even during the examination of the object. This permits in particular regulation of the light source in terms of a constant energy parameter of the illumination radiation in the object. This reduces user interaction, which simplifies experiments. The measurement data acquired with respect to the illumination of the object can be linked to the recorded images in a manner such that a particularly precise documentation with respect to the illumination conditions is obtainable.

The energy parameter may be the intensity or the power or fluence.

The microscope can be used both for fluorescence microscopy and for laser-based techniques, in particular in wide field. It is furthermore possible to use the microscope in the case of illumination radiation that effects optical manipulation techniques, such as FRAP (fluorescence recovery after photobleaching) or FLIP (fluorescence loss in photobleaching). In addition, the microscope can illuminate and/or image and/or process the object with different wavelengths, for example by way of laser ablation. The microscope can be a confocal microscope or a microscope for imaging the object in wide field. The microscope is preferably embodied to stimulate emission of fluorescence light in the object and to detect the fluorescence light emitted by the object. To this end, the object can be provided for example with fluorescent dyes. The object can be understood to be any sample, body or structure that is to be imaged using the microscope. The object can in particular comprise a biological sample.

The objective focuses the illumination radiation into the object and at the same time serves for imaging the object, i.e., for capturing the radiation that is produced by or reflected at the object. An image of the object is produced using the imaging beam path, at the end of which an image detector is located for converting the radiation, which has been guided along the imaging beam path, into electrical signals. A control device can, for example, convert the electrical signals into an electronic image of the object, which is represented for example on a display device and/or stored.

The light source can comprise a laser, a white light source, such as a halogen or mercury lamp, or a light-emitting diode (LED), or a combination thereof. In particular, the light source can produce illumination radiation in a broad wavelength range or illumination radiation having individual discrete wavelengths or wavelength ranges; the light source preferably comprises a plurality of individual light sources, which each produce radiation in different, for example discrete, wavelength ranges. The light source is preferably connected to the control device, which controls the intensity or the power of the illumination radiation. The light source can provide parallelized illumination radiation, or a lens or lens system, for example a microlens array, is arranged in front of the light source, by way of which the radiation provided by the light source can be parallelized. Alternatively, the illumination radiation in the illumination beam path may be guided in non-parallelized fashion. Whether the illumination radiation is parallelized is dependent not least on the imaging method that is performed using the microscope. In the case of laser scanning microscopes and optical manipulation techniques, the illumination radiation will generally be parallelized; in the case of wide-field imaging or TIRF experiments (total internal reflection fluorescence), on the other hand, the illumination radiation typically travels through the illumination beam path in a convergent manner.

The optical element serves for coupling the illumination radiation into the imaging beam path. The optical element can be, for example, a dichroic mirror, which reflects radiation in the wavelength range of the illumination radiation and transmits radiation in the wavelength range of the imaging, for example fluorescence radiation produced by the object. It is likewise possible to swap the reflection and transmission behavior of the optical element. The illumination beam path for guiding the illumination radiation from the light source to the object and the imaging beam path in this case extend identically from the optical element to the objective/object.

The monitoring device determines the energy parameter of the radiation that is incident thereon, for example the intensity or the power of the measurement radiation. The monitoring device can be embodied as a photodetector, CCD sensor or the like, and is in particular embodied for detecting radiation in a wavelength range from 355 nm to 700 nm; it furthermore has, for example, a dynamic range of $10^5$. If the microscope is also used for optical manipulation techniques, like optical tweezers, the monitoring device is able to detect the wavelength(s) used therein, for example 1064 nm or 800 nm. The monitoring device is preferably connected to the control device, such that the monitoring device provides a signal to the control device that corresponds to the energy parameter of the measurement radiation that is incident on the monitoring device.

The beam splitter device can be embodied as a beam splitter having a specified transmission and reflection behavior. It is furthermore possible for the beam splitter device to be a glass plate arranged in the imaging beam path. In particular, the beam splitter device is configured such that the measurement radiation, which is coupled out to the monitoring device, is small compared to the proportion of the illumination radiation that continues to travel to the objective/object. For example, only 15%, 10%, 5% or 1% of the illumination radiation is coupled out to the monitoring device in the form of measurement radiation. The beam splitter device is optionally arranged in an infinity space located in the imaging beam path between the objective and a tube lens. The infinity space is the space between objective and tube lens.

In the common beam path, that is to say the region between beam splitter device and objective, preferably no optical imaging elements are arranged that can change the energy parameter of the illumination radiation as it is incident in the object. For example, no filters, lenses, stops, pinholes or optical units are provided in the imaging beam path between the beam splitter device and the objective. This is because optical imaging elements would have the effect that the energy parameter of the illumination radiation in the object would be changed, and this change would not be captured by the monitoring device. Consequently, the monitoring device would not be able to directly capture the energy parameter of the illumination radiation that is present in the object. The beam splitter device is preferably arranged in the common beam path immediately next to the objective. An exception is a shutter which blocks the illumination radiation in the closed state and remains open during the examination. Of course, it is not effective during the examination.

The control device optionally has a memory in which a relationship between the energy parameter of the measurement radiation and the energy parameter of the illumination radiation on the object is stored. The relationship serves to determine for the measured actual value of the energy parameter of the measurement radiation the associated instantaneous value of the energy parameter on the object. The use of the relationship is thus a conversion step from measurement radiation to the illumination of the object. The inverse conversion is optionally possible because the relationship is mathematically generally invertible (when using an equation) or corresponding inverse tables can easily be compiled. The control device can control the light source such that the energy parameter of the illumination radiation, which has been produced by the light source, has a specified prescribed energy parameter within a tolerance range. The portion of the illumination radiation that has been reflected or absorbed by the objective and/or the portion of the illumination radiation that has been transmitted by the objective can also be included in the relationship as a parameter, for example in the form of transmittance. This value can be known for the respective objective or be determined before the actual measurement of the object. In particular, this value is stored in the memory in a wavelength-dependent fashion; the relationship can be wavelength-dependent. Furthermore, the ratio of measurement radiation to the remaining illumination radiation is stored in the memory of the control device. This may also be previously known or be determined before the actual measurement by way of calibration. Based on the specifications relating to the objective and to the beam splitting device, the control device can preferably calculate the power of the illumination radiation existing in the object from the energy parameter of the measurement radiation that has been captured by the monitoring device. For example, the power LO present in the object, the power L determined using the monitoring device, the portion of the radiation A that has been coupled out by the beam splitter device, and the transmittance T of the objective are related by way of the following equation:

$$LO = L \times T \times \left(\frac{1-A}{A}\right)$$

If it is the intensity rather than the power that should be used as the energy parameter, the power will also be divided by the area of the radiation onto the monitoring device. The area may be known, or the monitoring device is spatially resolving and consequently permits simultaneously a measurement of the beam cross-sectional area of the measurement radiation.

The control device optionally controls the light source such that the energy parameter of the illumination radiation, which has been produced by the light source, corresponds to a specified prescribed energy parameter within a tolerance range, taking into account the relationship. The prescribed energy parameter can be the desired value with which the object is to be illuminated. The control device can consequently keep the value of the energy parameter in the object constant.

Since it is preferred that no further optical imaging elements be provided between beam splitter device and objective, further parameters such as filters, pinholes or lenses, and the transmission or reflection properties thereof, need not be considered. Furthermore, the control device can comprise a capturing device by means of which the type of the objective that is arranged in the imaging beam path is ascertained and which knows specifications relating to the transmission behavior of the respective objectives arranged in the imaging beam path.

The microscope furthermore preferably comprises an interface for an autofocus device for determining the focus of the objective in the object, wherein the interface comprises an autofocus beam path for guiding autofocus radiation to the object. The beam splitter device then has a dual function, because, on the objective side, it couples autofocus radiation into and/or out of the common beam path, and, on the light source side, it couples out the measurement radiation to the monitoring device. In one refinement, the transmitted light microscope therefore has an autofocus device for determining the focus of the objective for the object. The autofocus device comprises an autofocus beam path for guiding autofocus radiation to the objective. The beam splitter device has a dual function, because, on the objective side, it couples autofocus radiation into and/or out of the common beam path, and, on the light source side, it couples out the measurement radiation to the monitoring device. In known reflected light microscopes, not enough space exists in the common beam path for appropriately arranging all optical elements therein. In particular in the section of the beam path between objective and tube lens, that is to say in the infinity space, little space exists in conventional microscopes. Due to the dual function of the beam splitter device, however, both an autofocus device and the monitoring device can be moved in the spatially constrained region, and despite a dearth of installation space it is possible to arrange both a monitoring device and an autofocus device. With respect to the objective, the light source, the optical element, and/or the monitoring device, the considerations mentioned above analogously apply to this development. Moreover, it is preferred that the common beam path be free from optical imaging elements between the beam splitter device, which couples out the measurement radiation, and the objective. The interface is embodied such that the autofocus device can be connected to it and at the same time the radiation that is relevant for the autofocus device can be guided through the interface. The autofocus device can of course comprise an optional interface for the monitoring device. It is likewise possible for the autofocus device to be a module consisting of autofocus device and monitoring device. The interface is for example a thread, and the autofocus beam path can comprise a cross section through which the autofocus radiation is guided. The autofocus device can be an element that is separate from the microscope and be embodied as described in WO 2007/144197 A1, DE 102008018952 A1 or DE 102008018864 A1. The autofocus device comprises an autofocus light source serving for producing the autofocus radiation. The autofocus radiation is guided using the autofocus beam path via the beam splitter device to the objective and thus to the object. The autofocus radiation is reflected or scattered by the object, collected by the objective, and guided using the autofocus beam path via the beam splitter device to an autofocus detector. To this end, a beam splitter may be provided in the autofocus device, by means of which the autofocus radiation produced by the autofocus light source can be coupled in and/or the autofocus radiation coming from the object can be coupled out to the autofocus detector. The autofocus illumination radiation, which is produced by the autofocus light source, and the autofocus measurement radiation, which is guided to the autofocus detector, are combined here in the term "autofocus radiation." They are coupled in and out together via the beam splitter device. However, it is also possible for a further beam splitter to be provided in the imaging beam path, by means of which autofocus radiation is coupled into or out of the common beam path. It is thus possible in this embodiment for the autofocus light source and the autofocus detector to be arranged at different locations in the microscope and at a large distance from one another.

For example, an obliquely placed grating that is imaged into the object can be located in the autofocus beam path with the result that the backscatter at the object is monitored using the autofocus detector and consequently the position of the focus is determined. In another embodiment, the autofocus light source can produce a dot-type light point in the object, the sharpness or extent of which is measured using the autofocus detector, and consequently conclusions relating to the position of the focus can be drawn. In particular, the autofocus device is connected to the control device, wherein the control device can set or adjust the position of the focus based on the values ascertained by the autofocus device. It is thus possible to correct drift in the position of the focus using the autofocus device. The autofocus radiation is preferably in a wavelength range that is not used for imaging the object. For example, the autofocus radiation is in the infrared wavelength range, and the illumination radiation is in the visible wavelength range.

The beam splitter device is embodied in particular in one piece or one part, which means that the objective-side surface of the beam splitter device and the light-source-side surface of the beam splitter device are close together. On the objective side, the beam splitter device can be embodied in the form of a dichroic mirror that, for example, transmits light in the wavelength range of the illumination radiation and the fluorescence radiation of the object, and reflects radiation in the wavelength range of the autofocus radiation.

When illuminating the object with a great intensity or power, it is sometimes desirable to avoid bleaching of fluorescence sources in the object by illuminating the object only temporarily. It is therefore preferred that the aforementioned shutter, which in one operating state blocks the common beam path such that no illumination radiation reaches the object, be arranged in the imaging beam path between the beam splitter device and the object. The shutter is generally connected to the control device. Even with a blocking shutter it continues to be possible to capture the energy parameter of the illumination radiation. If a shutter were located in front of the beam splitter device, this would not be possible. If the shutter is open, the illumination radiation can pass through without being obstructed. The shutter is optionally also used in optical manipulation experiments such as FRAP and/or laser ablation and/or FLIP. Here, the illumination device is used for manipulating the object. In optical manipulation experiments, the illumination radiation has a significantly greater power. That means that for example the illumination device is used to bleach or ablate, and the object is imaged to document the fluorescence. In some variants, these experiments are performed with two different wavelengths, which are then used at the same time; one wavelength range for bleaching or ablating, and the other wavelength range for imaging. In order to avoid undesirable bleaching before the energy parameter has the correct value or assumes that value constantly, the shutter can optionally be dichroic, for example for blocking (only) the illumination radiation, and other wavelengths can pass through it.

The extent of the illumination radiation in the object can be set using a radiant field stop which is arranged in an intermediate image plane that is conjugate to the object plane. The radiant field stop is arranged downstream of the light source and is arranged in particular upstream of the beam splitter device in the illumination direction, for example outside the common beam path in the illumination beam path, for example between the optical element and the light source. The radiant field stop preferably has a drive that is connected to the control device. The control device can furthermore be embodied to capture a degree of the opening of the radiant field stop, for example in order to detect a manual adjustment of the radiant field stop.

The output coupling of the measurement radiation from the illumination radiation and the input or output coupling of the autofocus radiation can be accomplished particularly easily if the illumination radiation and the autofocus radiation are parallelized. It is therefore preferred that the beam splitter device be arranged in a section in which the common beam path is parallelized between the optical element and the objective. The beam splitter device can consequently be arranged in the infinity space. The aforementioned shutter is generally arranged in the section of the common beam path that is in the infinity space.

In order to be able to better determine the energy parameter of the illumination radiation present in the object, the microscope has a monitoring stop, which is arranged between the beam splitter device and the monitoring device and has an adjustable opening, and a control device, which sets the opening of the monitoring stop depending on the effective aperture of the objective. The effective aperture in particular corresponds to the extent of the illumination radiation as it enters the objective in the illumination direction. If the extent of the illumination radiation is greater than the aperture of the objective, the effective aperture corresponds to the aperture of the objective. If the extent of the illumination radiation at the objective is smaller than the aperture of the objective, for example because it is limited by the radiant field stop, the effective aperture corresponds to the diameter of the radiant field stop.

The monitoring stop can furthermore be swapped for one with a different opening, for example by inserting the desired monitoring stop into the measurement radiation by way of a slider.

If the effective aperture does not correspond to the diameter of the measurement radiation, the diameter of the measurement radiation can be adapted to the effective aperture using the monitoring stop. To this end, the monitoring stop can be connected to the control device which adapts the opening of the monitoring stop to the effective aperture. The effective aperture can be determined, for example, to the aperture of the objective, in particular if the diameter of the illumination radiation is greater than that of the objective, or by capturing the opening of the radiant field stop. In this way, the energy parameter of the illumination radiation in the object can be monitored more accurately because the extents of the illumination radiation passing through the objective and of the measurement radiation are the same. In particular, the cross section of the measurement radiation is adapted such that the same portion of the illumination radiation can pass the objective and the monitoring stop. In this way, it is possible to minimize deviations between the measured energy parameter and the energy parameter present in the object due to a non-uniform intensity profile or power profile of the illumination radiation, such as a Gaussian profile.

In order to decrease the size of the construction and to reduce the construction effort for the microscope, it is preferred that a monitoring optical unit, which focuses the measurement radiation onto the monitoring device, be arranged downstream of the beam splitter, wherein the monitoring device preferably comprises a non-spatially-resolving detector, for example a photodiode. Together with the monitoring stop, it is then possible to use a non-spatially-resolving detector and nevertheless take into account the diameter of the illumination radiation or the effective aperture. Since non-spatially-resolving detectors typically have a smaller, and moreover simpler, construction than spatially resolving detectors, it is thus possible to save both in terms of installation space and outlay.

However, the effective aperture can also be captured by way of the monitoring device having a spatially resolving detector, for example a CCD (charge-coupled device) sensor. The spatially resolving detector can be used to determine the beam cross section of the measurement radiation. In particular, an intensity distribution and/or the shape and size of the spot of the illumination radiation can be determined. It is possible using these results to more accurately specify the energy parameter of the illumination radiation present in the object.

It is furthermore preferred that the microscope comprise at least one filter for attenuating and/or absorbing at least one wavelength range of the illumination radiation, which filter is arranged between the beam splitter device and monitoring device. The filter can serve for attenuating the entire wavelength range of the illumination radiation. Owing to its presence, it is possible to detect illumination radiation with a high-energy parameter using the monitoring device, without damaging the monitoring device. The filter makes it possible to capture a greater energy parameter range using the monitoring device. Moreover, the filter can also be embodied as a bandpass filter, which allows only radiation of a specific wavelength range to pass. In particular when the monitoring device is embodied for detecting radiation in a specified wavelength range, such a filter can avoid measurement errors due to radiation from other wavelength ranges. The filter can furthermore be embodied as a longpass or shortpass filter to block undesired radiation before the monitoring device, for example autofocus radiation or radiation of the fluorescence light. Preferably, one or more filters are arranged in the above-described manner between the beam splitter device and the monitoring device.

It is in particular advantageous if the filter can be inserted into and removed from the portion of the illumination radiation that has been coupled out in the form of measurement radiation. In this way, the capturing of the measurement radiation can be optimized depending on the wavelength range of the illumination radiation. It is in particular preferred that the microscope comprise a filter drive for moving at least one filter out of or into the measurement radiation. The filter drive can comprise for example an electric motor or a linear drive. The filter drive is connected in particular to the control device, such that the position of the at least one filter can be controlled using the control device. The control device can move, for example automatically, the corresponding filter depending on wavelength range of the illumination radiation and the energy parameter of the illumination radiation between the beam splitter device and the monitoring device. Alternatively, this can also be accomplished manually.

Moreover, it is preferred that the beam splitter device be movable into and out of the common beam path. To this end, the beam splitter device can comprise a drive that is preferably connected to the control device. Without a beam splitter device in the common beam path, the illumination radiation is coupled into the object with the maximum possible energy parameter, because no measurement radiation is separated out in that case. In addition, the beam splitter device may be placed into the common beam path only when the monitoring of the light source is actually desired. In this embodiment, the energy parameter of the illumination radiation is corrected by calculation, specifically with respect to the measurement radiation, when the beam splitter device is/is not located in the common beam path.

The monitoring device can comprise detectors for capturing the illumination radiation in a broadband wavelength range. Moreover, it is possible for the monitoring device to have one or more detectors that detect radiation of only a specific wavelength range. In order to nevertheless capture a plurality of wavelength ranges, a device for separating the illumination beams by wavelength ranges may be provided, such as for example a prism and/or a grating. These are then arranged upstream of the detectors of the monitoring device in the illumination direction. Moreover, it is possible for the monitoring device to comprise a spectrometer. Due to the possibility of capturing a plurality of wavelength ranges, it is possible to detect using the monitoring device which of a plurality of light sources is currently used for illuminating the object. This is helpful in particular when the object is illuminated successively or simultaneously with illumination radiation in different wavelength ranges.

In a development, the relationship stored in the control device, mentioned at the outset, is wavelength-dependent, and the control device ascertains a wavelength of the illumination radiation and/or an excitation filter arranged in the illumination radiation. The wavelength or the wavelength range of the illumination radiation can be ascertained by detecting the instantaneously activated light source, wherein the spectral range of the light source is stored in the control device. The wavelength range of the illumination radiation can be modified via an excitation filter. For example, an excitation filter is used as a bandpass filter with a transmission range of 510 nm to 550 nm. To ascertain the excitation filter, the transmission spectrum thereof can be input for example manually. Moreover, the control device can capture the position of a turret on which a plurality of excitation filters are arranged. To ascertain the properties of the excitation filter, the control device can use a database in which the transmission spectra of the excitation filters used are stored.

Based on the knowledge of the wavelength or the wavelengths of the illumination radiation and/or of the excitation filter used, it is thus known which wavelength range is covered by the illumination radiation. If at the same time the relationship is wavelength-dependent, the energy parameter by way of which the object is illuminated can be adapted with respect to the wavelength range of the illumination radiation.

Optionally, the relationship is dependent on parameters of the objective. Parameters of the objective can be the numerical aperture, the instantaneous field of view, the magnification, the aperture, and/or the object field. As described above, a parameter can be the transmission property and/or reflection property, also in a wavelength-dependent fashion. The parameters of the objective can be input manually, be stored in the control device, or be ascertained by the control device. For example, a plurality of objectives are arranged on a turret and the control device can capture the position of the turret and consequently ascertain the objective that is arranged in the illumination beam path. To this end, the control device can be connected to a sensor that can capture the position of the turret. Moreover, it is also possible for the objectives to be provided with a marking, for example an RFID chip, and for a sensor that is connected to the control device to ascertain the respective objective on the basis of the marking. By ascertaining the objective, the relationship can be adapted to the different transmission or reflection properties of the objective. This leads to a more accurate determination of the energy parameter of the illumination radiation.

The relationship is optionally dependent on a diameter of the illumination radiation, a profile of the illumination radiation, a convergence of the illumination radiation, and/or an immersion medium present between the object and the objective. The diameter of the illumination radiation can be set, for example, using a radiant field stop. To this end, the control device can be connected to a sensor that can capture the size of the opening of the radiant field stop. It is furthermore possible to input the diameter of the illumination radiation manually, for example after the radiant field stop has been correspondingly set. Moreover, the diameter of the illumination radiation can also be set due to the fact that the diameter of the illumination radiation for the respective light source is known. Similarly, the profile of the illumination radiation can be ascertained for example because for each of the light sources used the profile of the illumination radiation is known. The convergence of the illumination radiation can depend on the respective type of the microscope or on the measurement that is to be performed. For example, the radiation is convergent for widefield imaging or in total internal reflection microscopy (TIRF). In laser scanning microscopes, optical tweezers, or in optical manipulations, the illumination beams can be parallel. This can be communicated to the control device for example via an input interface.

All parameters mentioned and the immersion medium present between the objective and the object exert influence on the energy parameter of the illumination radiation in the object. Due to the knowledge of one or more or all of said parameters, the relationship can be modified such that it provides a more accurate link between the energy parameter of the measurement radiation and the energy parameter of the illumination radiation in the object. The parameters mentioned can therefore be included in the relationship as variables.

In a development, the light source is embodied to produce illumination radiation simultaneously with at least two different wavelengths, and/or the monitoring device is embodied to determine the energy parameter of the illumination radiation for at least two different wavelengths. It is also possible in this preferred development to control the energy parameter of the illumination radiation in the object for two different wavelength ranges at the same time. This can preferably also be performed for three or more different wavelength ranges. To this end, for each wavelength range a corresponding relationship is stored in the control device.

An element can optionally be provided between the beam splitter for coupling out the measurement radiation from the illumination radiation and the objective. Especially in connection with laser scanning microscopy, a "differential interference contrast" is frequently used, wherein a prism, for example a Wollaston prism, is inserted into the objective pupil directly in the imaging direction downstream of the objective. This, too, can be wavelength-dependent, which can then preferably also be taken into account in this embodiment.

It goes without saying that the aforementioned features and those yet to be explained below can be used not only in the combinations specified but also in other combinations or on their own, without departing from the scope of the present invention.

BRIEF DESCRIPTION OF THE DRAWINGS

The invention is explained in more detail below for example on the basis of the accompanying drawings, which also disclose features essential to the invention. In the figures.

DETAILED DESCRIPTION

Figure 1:
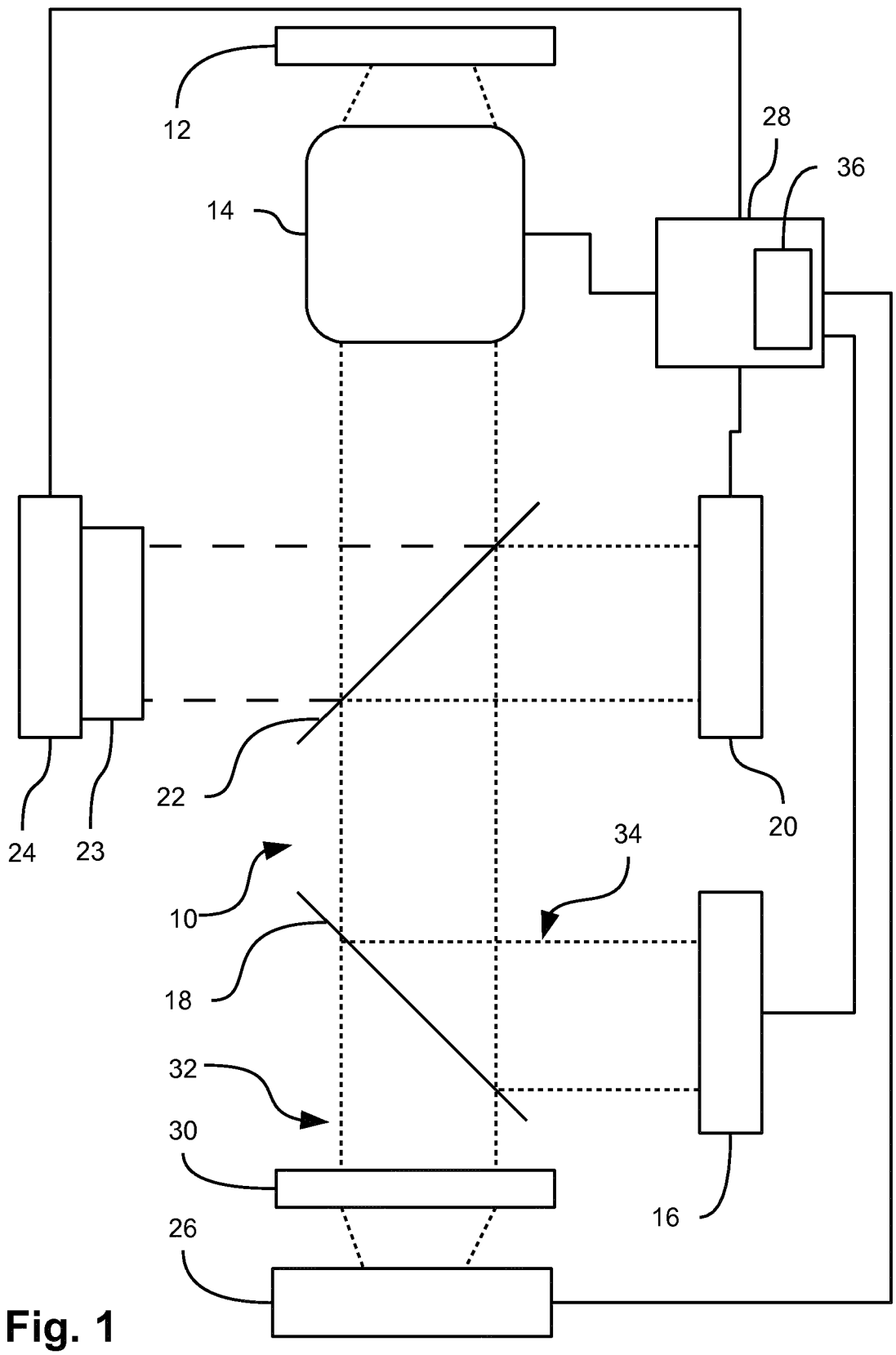
FIG. 1 shows a schematic illustration of a first embodiment of the microscope.

A reflected light microscope 10 in accordance with the embodiment shown in FIG. 1 serves for imaging an object 12, in particular in wide field. The microscope 10 can also be embodied as a confocal microscope; in this case there is typically a pinhole in the beam path. The object 12 can contain fluorescent dyes or substances that emit fluorescence radiation after stimulation. The microscope 10 comprises an objective 14, a light source 16, an optical element 18, a monitoring device 20, a beam splitter device 22, an interface 23 for an autofocus device 24, an imaging detector 26, and a control device 28.

The objective 14, the beam splitter device 22, the optical element 18, and a lens element 30, and also the imaging detector 26 form an imaging beam path 32. The light source 16, the optical element 18, the beam splitter device 22, and the objective 14 form an illumination beam path 34. The imaging beam path 32 and the illumination beam path 34 extend in a common beam path between the objective 14 and the optical element 18.

The objective 14 therefore serves both for focusing the illumination radiation of the illumination beam path 34 onto the object 12 and for imaging the object 12 through the imaging beam path 32. The object 12 is imaged onto the imaging detector 26 using the objective 14 and the lens element 30; the lens element 30 can be considered to be a tube lens. The imaging detector 26 converts the radiation that is incident thereon into electrical signals, which are transmitted for example using a line to the control device 28. The control device 28 produces from the electrical signals an image of the object 12, which can be displayed on a display device (not illustrated). The image of the object 12 can be a fluorescence image, for example.

The light source 16 can be embodied as a laser, a light-emitting diode (LED), or as a white light source. The light source 16 preferably produces parallelized illumination radiation; to this end, the light source 16 can comprise a lens or a lens system (not illustrated in the figure), which parallelizes the illumination radiation. The illumination radiation is coupled into the imaging beam path 32 via the optical element 18, which is embodied for example as a dichroic mirror. The illumination radiation comprises for example a wavelength range that serves for stimulating fluorescence radiation in the object 12. The radiation emitted by the object 12 typically preferably comprises a different wavelength range than the wavelength range of the illumination radiation, and therefore the optical element 18 is typically dichroic and affects only the illumination radiation.

The beam splitter device 22, which may be embodied for example as a beam splitter, is used to separate a portion of the illumination radiation from the common beam path, in particular in a wavelength-independent fashion, as measurement radiation and to guide it to the monitoring device 20. The portion of the illumination radiation which has been coupled out can amount to for example 10%, 5% or 1% of the intensity or the power of the illumination radiation before the separation. The monitoring device 20 in the embodiment of the microscope 10 from FIG. 1 is embodied as a spatially resolving detector, such as a CCD sensor (charge-coupled device), which converts, in a spatially resolving manner, the radiation that is incident thereon into electrical signals. The electrical signals produced by the monitoring device 20 are guided to the control device 28 via a line. The electrical signals produced by the monitoring device 20 are in particular proportional to the intensity or power of the radiation that is incident on the monitoring device 20, with the result that the control device 28 can determine the intensity of the measurement radiation that is incident on the monitoring device 20 from the signals.

The control device 28 preferably comprises a memory 36, in which an optionally wavelength-dependent relationship is stored, which describes the percentage of the illumination radiation that is separated by the beam splitter device 22 as measurement radiation from the common beam path to the monitoring device 20. The memory 36 can be, for example, a writable or non-writable storage medium, such as RAM or ROM. Based on the energy parameter of the measurement radiation that has been captured by the monitoring device 20, the control device 28 can ascertain the energy parameter of the illumination radiation provided by the light source 16. What is more significant, however, is that the control device 28 ascertains the energy parameter of the illumination radiation in the object 12 via the relationship. The relationship links the energy parameter of the measurement radiation to the energy parameter of the illumination radiation on the object 12. The control device 28 then optionally controls the light source 16 such that the energy parameter of the illumination radiation, which has been produced by the light source 16, corresponds to a specified prescribed energy parameter within a tolerance range.

The relationship can be dependent on parameters of the objective 14. Parameters of the objective 14 can be the numerical aperture, the instantaneous field of view, the magnification, the aperture, or the object field. A parameter of the objective 14 is optionally the transmission and/or reflection behavior of the objective 14. To this end, the control device 28 can be connected to the objective 14 to ascertain for example the type of objective which is present in the common beam path 32 at that moment. For example, a plurality of objectives 14 can be arranged on a turret, and the control device 28 can ascertain the objectives 14 which are present in the common beam path at that moment. A relationship specifying, in a wavelength-dependent fashion, the transmission and/or reflection behavior of the objective 14 is preferably stored in the memory 36. Moreover, the aperture of the objectives 14 that are to be used in the microscope 10 can also be stored. Based on the transmission and/or reflection properties of the objective 14 and the knowledge of the intensity of the illumination radiation, the control device 28 can in particular precisely ascertain the energy parameter of the illumination radiation that is present in the object 12. For example, the power LO present in the object 12, the power L determined using the monitoring device 20, the portion of the radiation A that has been coupled out by the beam splitter device 22, and the transmittance T of the objective 14 are related by way of the following equation:

$$LO = L \times T \times \left(\frac{1-A}{A}\right)$$

Since the monitoring device 20 has a spatially resolving detector, the control device 28 also determines a beam cross section of the measurement radiation. If the extent of the illumination radiation is greater than the aperture of the objective 14, not all illumination passes through the objective 14, and not all the illumination radiation that is available will be focused onto the object 12. It is thus possible, using the spatially resolving monitoring device 20, when ascertaining the energy parameter of the illumination radiation in the object, to take into account the portion of the illumination radiation which has not been utilized when the relationship has, as the parameter, the aperture of the objective 14.

Furthermore, the stored relationship can be dependent on a diameter of the illumination radiation, a profile of the illumination radiation, a convergence of the illumination radiation, and/or an immersion medium present between the object 12 and the objective 14. The diameter of the illumination radiation can be set, for example, using a radiant field stop 41. To this end, the control device 28 can be connected to a sensor that captures the size of the opening of the radiant field stop 41. It is furthermore possible to input the diameter of the illumination radiation manually, for example after the radiant field stop 41 has been correspondingly set. Moreover, the diameter of the illumination radiation can also be ascertained due to the fact that it is known for the respective light source 16. Similarly, the profile of the illumination radiation can be ascertained for example because for each light source 16 used the profile thereof of the illumination radiation is known. The convergence of the illumination radiation can depend on the respective type of the microscope or on the measurement that is to be performed. For example, the radiation is be convergent for wide-field imaging or in total internal reflection microscopy (TIRF). In laser scanning microscopes, optical tweezers, or in optical manipulations, the illumination radiations can be parallel. This specification can be made available for example to the control device 28 by way of an input interface.

All parameters mentioned and the immersion medium present between the objective 14 and the object 12 exert influence on the energy parameter of the illumination radiation in the object 12. Due to the knowledge of one or more or all of said energy parameters, the relationship can be modified such that it provides a more accurate specification of the energy parameter of the illumination radiation in the object from the energy parameter of the measurement radiation. The relationship can therefore have the parameters mentioned as variables.

The light source 16 can be embodied to produce illumination radiation with at least two different wavelengths at the same time. The monitoring device 20 can further be embodied to determine the energy parameters of the illumination radiation in the case of at least two different wavelengths. It is possible in this development to control the energy parameter of the illumination radiation in the object 12 for two, three or more different wavelength ranges. To this end, for each wavelength range a corresponding relationship is stored in the control device 28.

The microscope comprises a for an autofocus device 24, the radiation of which can be guided through the interface 23. The interface 23 is for example a thread, and the autofocus beam path can comprise an opening through which the autofocus radiation is guided. The autofocus device 24 serves for capturing the position of the focus of the objective 14. By way of example, a suitable autofocus device 24 is described in WO 2007/144197 A1. The autofocus device 24 can be a separate element from the microscope 10 and produces autofocus illumination radiation having a wavelength range which preferably does not correspond to the wavelength range of the illumination radiation or to the wavelength range of the fluorescence radiation that is produced by the object 12. The monitoring device 20 captures the position of the focus of the objective 14 from autofocus measurement radiation received from the object and transmits this specification to the control device 28. The control device 28 can then keep the focus of the objective 14 constant. However, this can also be accomplished by way of a separate control. Consequently, for example drift and other effects can be compensated for by actuating the objective 14.

On the objective side, the beam splitter device 22 is provided with a dichroic mirror which reflects the autofocus radiation and the illumination radiation and transmits the fluorescence radiation. On the light source side, the beam splitter device 22 comprises the beam splitter for coupling the measurement radiation out of the illumination beam path. Optionally, the properties of the dichroic mirror and of the beam splitter can be realized in a single optical beam splitter layer. The beam splitter device 22 is preferably a one-piece element having coatings that influence the reflection or transmission behavior thereof.

The common beam path is free from optical imaging elements between the objective 14 and the beam splitter device 22; in the embodiment shown in FIG. 1, no elements are provided in this region. Here, the radiation extends in approximately parallelized fashion; this corresponds to the infinity space.

Figure 2:
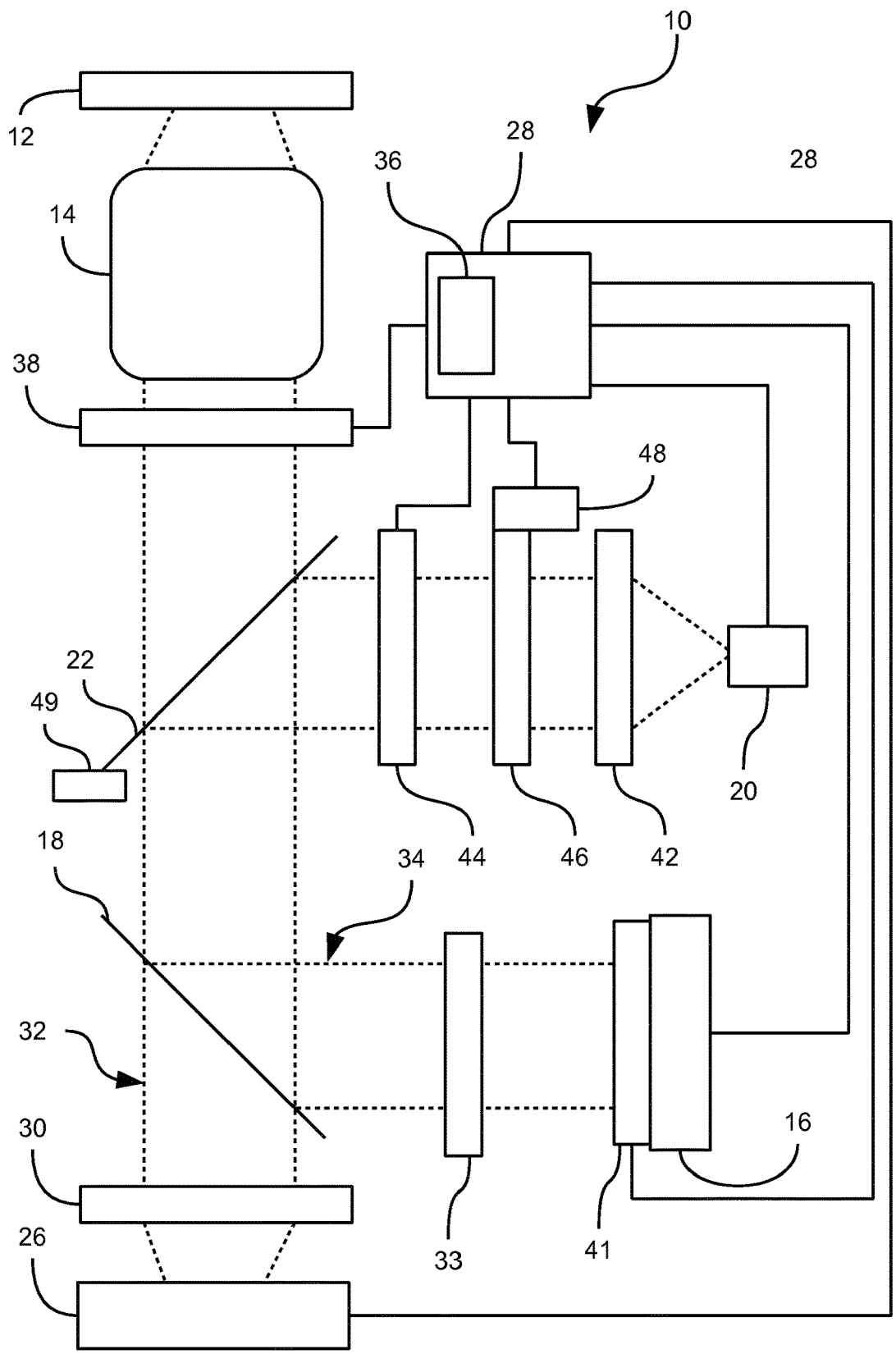
FIG. 2 shows a schematic illustration of a second embodiment of the microscope.

The embodiment of the microscope 10 shown in FIG. 2 corresponds to the embodiment shown in FIG. 1 in terms of their fundamental structure. Although the autofocus device 24 is not shown in FIG. 2, it may likewise be provided in FIG. 2. The following text will mention only the other differences between the two embodiments in accordance with FIGS. 1 and 2:

A shutter 38 is provided in the common beam path between the objective 14 and the beam splitter device 22. The shutter 38 is connected to the control device 28 by way of a line and is switchable between two operating states by the control device 28. In one operating state, the shutter 38 blocks the common beam path, with the result that no illumination radiation can reach the object 12. In another operating state, the shutter 38 is open, which means that the common beam path is free.

As an option which is independent of the shutter, a radiant field stop 41 is arranged downstream of the light source 16 and can be used to change the field dimension of the illumination radiation. The radiant field stop 41 is connected to the control device 28 via a line, wherein the control device 28 can control and/or ascertain the position and/or size of the opening of the radiant field stop 41. It is possible in this way to change the cross section of the illumination radiation before the common beam path.

As a further independent option, the monitoring device 20 in the embodiment shown in FIG. 2 is embodied as a non-spatially-resolving detector, for example a photodiode. This embodiment takes up less space than the spatially resolving detector in accordance with FIG. 1 and has a simpler construction. In order to focus the measurement radiation onto the monitoring device 20, a monitoring optical unit 42 is arranged between the beam splitter device 22 and the monitoring device 20. The monitoring optical unit 42 can comprise one or more lenses. The monitoring optical unit 42 focuses the measurement radiation, which has been coupled out of the parallelized illumination beam path 34, onto the monitoring device 20.

Furthermore, an optional iris diaphragm 44 and an optional filter 46 are arranged between the beam splitter device 22 and the monitoring device 20. The iris diaphragm 44 is connected to the control device 28, whereby the control device 28 can vary and/or ascertain the size of an opening of the iris diaphragm. In particular, the control device 28 controls the iris diaphragm 44 such that the opening thereof corresponds to the effective aperture of the objective 14. In this way, the cross section of the measurement radiation and the cross section of the illumination radiation have the same size in the illumination beam path 34, which passes through the objective 14. Consequently, the intensity of the illumination radiation in the object 12 can be ascertained better. The effective aperture of the objective 14 is ascertained, as described above, from the type of the objective 14 and the size of the opening of the radiant field stop 41.

The filter 46 can be provided for attenuating the measurement radiation, in particular in a wavelength-independent manner, for example to avoid damage to the monitoring device 20 or to increase the measurement range of the monitoring device 20 with respect to the intensity. In addition, the filter 46 can be configured such that it blocks undesirable radiation which could falsify the result of the measurement of the intensity of the illumination radiation. For example, radiation in the wavelength range of the autofocus radiation or of the fluorescence light is blocked. Moreover, the filter 46 can be embodied as a bandpass filter, which means that only radiation having a wavelength range such that it can be captured by the monitoring device 20 is incident on the monitoring device 20. The microscope 10 can comprise, as described above, one or more filters 46. In particular, the microscope 10 comprises a filter drive 48, which can be used to change or remove the filter 46 between the beam splitter device 22 and the monitoring device 20. In particular, the control device 28 actuates the filter drive 48 such that the filter 46 that is desired for the respective measurement is connected between the beam splitter device 22 and the monitoring device 20.

The beam splitter device 22 can be formed from the common beam path. To this end, a drive 49, for example an electric motor or a linear drive, can be provided. The drive 49 is connected to the control device 28 for data communication via a line, which is not shown in the figures, or by radio. By removing the beam splitter device 22 from the common beam path or from the illumination beam path 34, the maximum intensity produced by the light source 16 is obtained at the object 12, because no measurement radiation is coupled out in this case.

Figure 3:
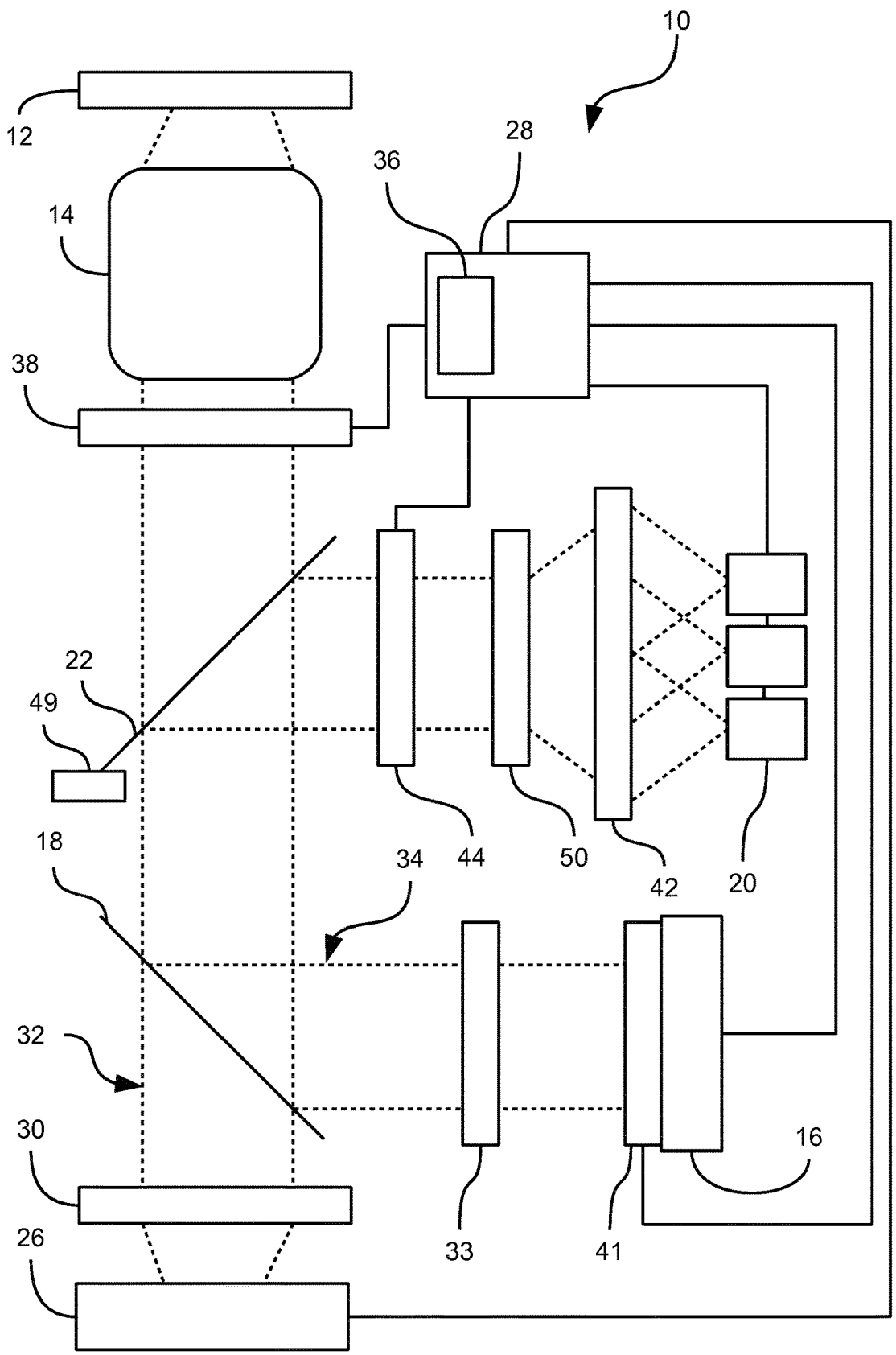
FIG. 3 shows a schematic illustration of a third embodiment of the microscope.

The embodiment of the microscope shown in FIG. 3 corresponds to the embodiment of the microscope 10 shown in FIG. 2, except for the provision of a spectral element 50 in place of the filter 46. However, it is also possible for both the filter 46 and the spectral element 50 to be provided between the monitoring device 20 and the beam splitter device 22. The spectral element 50 deflects the measurement radiation in a wavelength-dependent manner. For example, the spectral element 50 comprises a diffraction grating or a prism. Moreover, the monitoring device 20 has a plurality of, in particular non-spatially-resolving, detectors, which in each case detect incident radiation in one wavelength range. The radiation that has been deflected in a wavelength-dependent fashion by the spectral element 50 is focused onto the respective detectors of the monitoring device 20 using the monitoring optical unit 42. The monitoring device 20 is in this way embodied to be spectrometrically analyzing. This could also be accomplished in a different way, for example using a spectrometer.

The control device 28 is embodied to store the captured intensity of the illumination radiation continuously or at selected time points in the memory 36 such that for the images of the object 12, which have been recorded using the microscope 10, the intensity of the illumination radiation is specified. In this way, measurements can be documented better and, if required, reproduced.

In the embodiment shown in FIGS. 2 and 3, an excitation filter 33, arranged in the illumination beam path, can be provided. The excitation filter 33 is arranged downstream of the radiant field stop 41, for example. The wavelength range of the illumination radiation is modified by way of the excitation filter 33, for example by an excitation filter 33 having a transmission range of 510 nm to 550 nm. In order for the excitation filter 33 to be taken into account, the transmission spectrum thereof can be input for example manually, such that this information is available to the control device 28. Moreover, it is possible for the control device 28 to be embodied for capturing the position of a turret (not illustrated), on which a plurality of excitation filters 33 are arranged. To ascertain the excitation filter 33, the control device 28 can additionally use a database in which transmission spectra of the available excitation filters 33 are stored. If the control device knows the excitation filter 33 that has been used, it also knows the wavelength range covered by the illumination radiation. If the relationship is wavelength-dependent, the energy parameter by way of which the object 12 is illuminated can be adapted with respect to the wavelength range of the illumination radiation.

The invention claimed is:

1. A microscope for imaging an object, comprising:
an objective for imaging the object through an imaging beam path;
a light source for producing illumination radiation;
at least one optical element for coupling the illumination radiation into the imaging beam path, with the result that a common beam path is formed between optical element and objective, through which common beam path the imaging beam path extends and the illumination radiation is guide;

a monitoring device for measuring an energy parameter of the illumination radiation, wherein the monitoring device determines an energy parameter of radiation that is incident thereon;

a beam splitter device, which is arranged in the illumination direction in the common beam path upstream of the objective and couples out measurement radiation from the illumination radiation to the monitoring device, wherein the common beam path is free from optical imaging elements between the beam splitter device, which couples out the measurement radiation, and the objective; and at least one filter for attenuating and/or absorbing at least one wavelength range of the illumination radiation, wherein the filter is arranged between the beam splitter device and the monitoring device.

2. The microscope as claimed in claim 1, characterized by an interface for an autofocus device for determining a position of the focus in the object, wherein the beam splitter device has a dual function because, on the objective side, it couples autofocus radiation into/out of the interface into the imaging beam path, and, on the light source side, it couples out the measurement radiation to the monitoring device, and wherein optionally the microscope comprises an autofocus device which is able to be coupled to the interface.

3. The microscope as claimed in claim 1, characterized in that a shutter, which in one operating state blocks the illumination radiation, is provided in the common beam path between the beam splitter device and the objective.

4. The microscope as claimed in claim 1, characterized in that the beam splitter device is arranged in an infinity space between the optical element and the objective.

5. The microscope as claimed in claim 1, characterized by a monitoring stop, which is arranged between the beam splitter device and the monitoring device and the opening of which is adjustable in terms of position and/or size, and a control device, which sets the opening of the monitoring stop appropriately with respect to the effective aperture of the objective.

6. The microscope as claimed in claim 5, characterized by a monitoring optical unit, which focuses the measurement radiation of the illumination radiation onto the monitoring device, wherein the monitoring device comprises a non-spatially-resolving detector.

7. The microscope as claimed in claim 1, characterized in that the monitoring device comprises a spatially resolving detector.

8. The microscope as claimed in claim 1, characterized by a filter drive for moving the at least one filter out of or into the measurement radiation of the illumination radiation.

9. The microscope as claimed in claim 1, characterized in that the beam splitter device is movable out of or into the illumination beam path.

10. The microscope as claimed in claim 1, characterized in that a relationship between the energy parameter of the measurement radiation and the energy parameter of the illumination radiation on the object is stored in the control device, and the control device controls or regulates the light source such that a value of the energy parameter on the object corresponds to a specified prescribed value within a tolerance range.

11. The microscope as claimed in claim 10, characterized in that the relationship is wavelength-dependent, wherein optionally the control device captures a wavelength of the illumination radiation and/or ascertains an excitation filter arranged in the illumination radiation.

12. The microscope as claimed in claim 10, characterized in that the control device captures at least one parameter of the objective and the relationship is dependent on the at least one parameter of the objective.

13. The microscope as claimed in claim 10, characterized in that the relationship is dependent on a diameter of the illumination radiation, a profile of the illumination radiation, a convergence of the illumination radiation, and/or an immersion medium present between the object and the objective.

14. The microscope as claimed in claim 10, characterized in that the light source is embodied to produce illumination radiation simultaneously with at least two different wavelengths, and/or in that the monitoring device is embodied to determine the energy parameter of the measurement radiation with at least two different wavelengths.

* * * * *